United States Patent
Yan et al.

(10) Patent No.: US 11,822,079 B2
(45) Date of Patent: Nov. 21, 2023

(54) WAVEGUIDED DISPLAY SYSTEM WITH ADJUSTABLE LENSES

(71) Applicant: Apple Inc., Cupertino, CA (US)

(72) Inventors: Jin Yan, San Jose, CA (US); Young Cheol Yang, Sunnyvale, CA (US); Igor Stamenov, Cupertino, CA (US); Scott M. DeLapp, Sunnyvale, CA (US); Francesco Aieta, San Francisco, CA (US); Bradley C. Steele, San Diego, CA (US); Enkhamgalan Dorjgotov, Mountain View, CA (US); Se Baek Oh, Millbrae, CA (US)

(73) Assignee: Apple Inc., Cupertino, CA (US)

( * ) Notice: Subject to any disclaimer, the term of this patent is extended or adjusted under 35 U.S.C. 154(b) by 370 days.

(21) Appl. No.: 16/520,718

(22) Filed: Jul. 24, 2019

(65) Prior Publication Data

US 2020/0049996 A1 Feb. 13, 2020

Related U.S. Application Data

(60) Provisional application No. 62/717,628, filed on Aug. 10, 2018.

(51) Int. Cl.
*G02B 27/01* (2006.01)
*G02F 1/137* (2006.01)
(Continued)

(52) U.S. Cl.
CPC ....... *G02B 27/0172* (2013.01); *G02B 6/0035* (2013.01); *G02F 1/137* (2013.01);
(Continued)

(58) Field of Classification Search
None
See application file for complete search history.

(56) References Cited

U.S. PATENT DOCUMENTS

| 8,508,830 B1 | 8/2013 | Wang |
| 8,599,301 B2 | 12/2013 | Dowski, Jr. et al. |

(Continued)

FOREIGN PATENT DOCUMENTS

| CN | 1264842 A | 8/2000 |
| CN | 1871545 A | 11/2006 |

(Continued)

*Primary Examiner* — Thanh Nhan P Nguyen
(74) *Attorney, Agent, or Firm* — Treyz Law Group, P.C.; Michael H. Lyons

(57) ABSTRACT

An electronic device may have a display that provides image light to a waveguide. First and second liquid crystal lenses may be mounted to opposing surfaces of the waveguide. An coupler may couple the image light out of the waveguide through the first lens. The second lens may convey world light to the first lens. Control circuitry may control the first lens to apply a first optical power to the image light and the world light and may control the second lens to apply a second optical power to the world light that cancels out the first optical power. Each lens may include two layers of liquid crystal molecules having antiparallel pretilt angles. The pretilt angles and rubbing directions of the first lens may be antiparallel to corresponding pretilt angles and rubbing directions of the second lens about the waveguide.

20 Claims, 8 Drawing Sheets

(51) Int. Cl.
*F21V 8/00* (2006.01)
*G02F 1/1337* (2006.01)
*G02F 1/1347* (2006.01)
*G02F 1/133* (2006.01)

(52) U.S. Cl.
CPC ...... *G02F 1/13306* (2013.01); *G02F 1/13471* (2013.01); *G02F 1/133784* (2013.01)

(56) References Cited

U.S. PATENT DOCUMENTS

| | | |
|---|---|---|
| 9,927,614 B2 | 3/2018 | Vallius |
| 10,168,540 B2 | 1/2019 | Kroll et al. |
| 10,609,363 B2 | 3/2020 | Cheng et al. |
| 2007/0008617 A1* | 1/2007 | Shestak ................ H04N 13/359 359/455 |
| 2011/0221656 A1 | 9/2011 | Haddick et al. |
| 2018/0146188 A1 | 5/2018 | Simmonds |
| 2019/0227375 A1 | 7/2019 | Oh et al. |
| 2019/0377181 A1* | 12/2019 | Myhre ................ G02B 6/0023 |

FOREIGN PATENT DOCUMENTS

| | | |
|---|---|---|
| CN | 101023392 A | 8/2007 |
| CN | 103399445 A | 11/2013 |
| CN | 107422570 A | 12/2017 |
| WO | 2017176898 A1 | 10/2017 |

\* cited by examiner

WAVEGUIDED DISPLAY SYSTEM WITH ADJUSTABLE LENSES

This application claims the benefit of provisional patent application No. 62/717,628, filed Aug. 10, 2018, which is hereby incorporated by reference herein in its entirety.

BACKGROUND

This relates generally to electronic devices and, more particularly, to electronic devices with displays.

Electronic devices with displays may be used to display content for a user. If care is not taken, the components used in displaying content for a user in an electronic device may be unsightly and bulky and may not exhibit desired levels of optical performance.

SUMMARY

An electronic device may have a display that provides image light to a waveguide via an input coupler. The image light may propagate through the waveguide under the principle of total internal reflection. A first liquid crystal lens may be mounted to a first surface of the waveguide and a second liquid crystal lens may be mounted to a second surface of the waveguide. An output coupler may couple the image light out of the waveguide through the first liquid crystal lens. The second liquid crystal lens may convey world light from objects external to the electronic device to the first liquid crystal lens through the waveguide.

Control circuitry may control the first liquid crystal lens to exhibit a first index-of-refraction profile that applies a first optical power to the image light and the world light. The control circuitry may control the second liquid crystal lens to exhibit a second index-of-refraction profile that applies a second optical power to the world light that at least partially cancels out the first optical power. A linear polarizer may be interposed between the waveguide and the first liquid crystal lens to ensure the linear polarization aligns with the rubbing directions of the liquid crystal lenses. If desired, a third liquid crystal lens may be mounted to the first liquid crystal lens and a fourth liquid crystal lens may be mounted to the second liquid crystal lens. If the third and fourth liquid crystal lenses are employed, the linear polarizer may be omitted and both polarization states from the world light and the image light may be used.

The first and second liquid crystal lenses may include transparent substrates with aligned rubbing directions. Each liquid crystal lens may include two layers of liquid crystal molecules having antiparallel pretilt angles. The pretilt angles and rubbing directions of the first liquid crystal lens may be antiparallel to corresponding pretilt angles and rubbing directions of the second liquid crystal lens about the waveguide.

DETAILED DESCRIPTION

Electronic devices such as head-mounted devices and other devices may be used for augmented reality and virtual reality systems. These devices may include portable consumer electronics (e.g., portable electronic devices such as tablet computers, cellular telephones, glasses, other wearable equipment, etc.), head-up displays in cockpits, vehicles, etc., and display-based equipment (televisions, projectors, etc.). Devices such as these may include displays and other optical components. Device configurations in which virtual reality and/or augmented reality content is provided to a user with a head-mounted display device are described herein as an example. This is, however, merely illustrative. Any suitable equipment may be used in providing a user with virtual reality and/or augmented reality content.

A head-mounted device such as a pair of augmented reality glasses that is worn on the head of a user may be used to provide a user with computer-generated content that is overlaid on top of real-world content. The real-world content may be viewed directly by a user through a transparent portion of an optical system. The optical system may be used to route images from one or more pixel arrays or a scanning device in a display system to the eyes of a viewer. A waveguide such as a thin planar waveguide formed from one or more sheets of transparent material such as glass or plastic or other light guides may be included in the optical system to convey image light from the pixel arrays to the viewer.

The illumination system may include a light source that supplies illumination for the display. The illuminated display produces image light. An input optical coupler may be used to couple light from the light source into a waveguide in the illumination system. An output optical coupler may be used to couple display illumination out of the waveguide. Input and output couplers may also be used to couple image light from the display into a waveguide in the optical system and to couple the image light out of the waveguide for viewing by the viewer.

The input and output couplers for the head-mounted device may form structures such as Bragg gratings, prisms, angled transparent structures, and/or lenses that couple light into the waveguide and that couple light out of the waveguide. Input and output optical couplers may be formed from diffractive couplers such as volume holograms, other holographic coupling elements, or other diffractive coupling structures. The input and output couplers may, for example, be formed from thin or thick layers of photopolymers and/or other optical coupler structures in which holographic patterns are recorded using lasers. In some configurations, optical couplers may be formed from dynamically adjustable devices such as liquid crystal components (e.g., tunable liquid crystal gratings, polymer dispersed liquid crystal devices), or other adjustable optical couplers.

Figure 1:
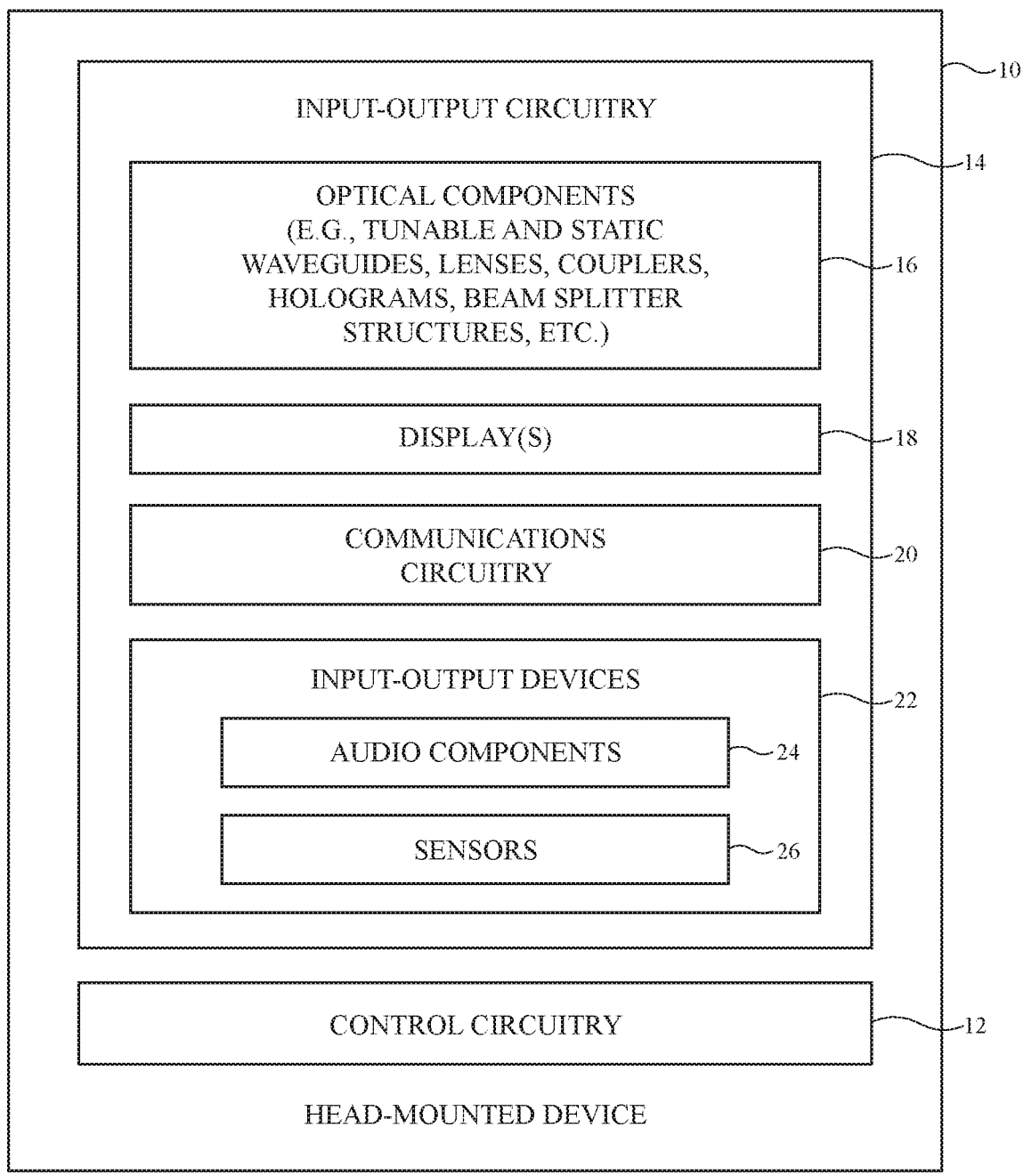
FIG. 1 is a schematic diagram of an illustrative head-mounted device in accordance with an embodiment.

A schematic diagram of an illustrative head-mounted device is shown in FIG. 1. As shown in FIG. 1, head-mounted device 10 may have control circuitry 12. Control circuitry 12 may include storage and processing circuitry for controlling the operation of head-mounted display 10. Circuitry 12 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement operations for head-mounted display 10 (e.g., data gathering operations, operations involving the adjustment of components using control signals, image rendering operations to produce image content to be displayed for a user, etc.).

Head-mounted device 10 may include input-output circuitry 14. Input-output circuitry 14 may be used to allow data to be received by head-mounted display 10 from external equipment (e.g., a tethered computer, a portable device such as a handheld device or laptop computer, or other electrical equipment) and to allow a user to provide head-mounted device 10 with user input. Input-output circuitry 14 may also be used to gather information on the environment in which head-mounted device 10 is operating. Output components in circuitry 14 may allow head-mounted device 10 to provide a user with output and may be used to communicate with external electrical equipment.

As shown in FIG. 1, input-output circuitry 14 may include one or more displays such as display(s) 18. Display(s) 18 may be used to display images for a user of head-mounted device 10. Display(s) 18 have pixel array(s) or laser scanning patterns to generate images that are presented to a user through an optical system. The optical system may, if desired, have a transparent portion through which the user (viewer) can observe real-world objects while computer-generated content is overlaid on top of the real-world objects by producing computer-generated images on the display(s) 18.

Optical components 16 may be used in forming the optical system that presents images to the user. Components 16 may include static components such as waveguides, static optical couplers, and fixed lenses. Components 16 may also include adjustable optical components such as an adjustable polarizer, tunable lenses (e.g., liquid crystal tunable lenses, tunable lenses based on electrooptic materials, tunable liquid lenses, microelectromechanical systems (MEMS) tunable lenses, or other tunable lenses), a dynamically adjustable coupler (e.g., an adjustable MEMs grating or other coupler), an adjustable liquid crystal holographic coupler such as an adjustable liquid crystal Bragg grating coupler, adjustable holographic couplers (e.g., electro-optical devices such as tunable Bragg grating couplers, polymer dispersed liquid crystal devices), couplers, lenses, and other optical devices formed from electro-optical materials (e.g., lithium niobate or other materials exhibiting the electro-optic effect), or other static and/or tunable optical components. Components 16 may be used in providing light to display(s) 18 to illuminate display(s) 18 and may be used in providing images from display(s) 18 to a user for viewing. In some configurations, one or more of components 16 may be stacked, so that light passes through multiple components in series. In other configurations, components may be spread out laterally (e.g., multiple displays may be arranged on a waveguide or set of waveguides using a tiled set of laterally adjacent couplers). Configurations may also be used in which both tiling and stacking are present.

Input-output circuitry 14 may include components such as input-output devices 22 for gathering data and user input and for supplying a user with output. Devices 22 may include sensors 26, audio components 24, and other components for gathering input from a user or the environment surrounding device 10 and for providing output to a user. Devices 22 may, for example, include keyboards, buttons, joysticks, touch sensors for trackpads and other touch sensitive input devices, cameras, light-emitting diodes, and/or other input-output components.

Cameras in input-output devices 22 may gather images of the user's eyes and/or the environment surrounding the user. As an example, eye-facing cameras may be used by control circuitry 12 to gather images of the pupils and other portions of the eyes of the viewer. The locations of the viewer's pupils and the locations of the viewer's pupils relative to the rest of the viewer's eyes may be used to determine the locations of the centers of the viewer's eyes (i.e., the centers of the user's pupils) and the direction of view (gaze direction) of the viewer's eyes.

Sensors 26 may include position and motion sensors (e.g., compasses, gyroscopes, accelerometers, and/or other devices for monitoring the location, orientation, and movement of head-mounted display 10, satellite navigation system circuitry such as Global Positioning System circuitry for monitoring user location, etc.). Using sensors 26, for example, control circuitry 12 can monitor the current direction in which a user's head is oriented relative to the surrounding environment. Movements of the user's head (e.g., motion to the left and/or right to track on-screen objects and/or to view additional real-world objects) may also be monitored using sensors 26.

If desired, sensors 26 may include ambient light sensors that measure ambient light intensity and/or ambient light color, force sensors, temperature sensors, touch sensors, capacitive proximity sensors, light-based proximity sensors, other proximity sensors, strain gauges, gas sensors, pressure sensors, moisture sensors, magnetic sensors, etc. Audio components 24 may include microphones for gathering voice commands and other audio input and speakers for providing audio output (e.g., ear buds, bone conduction speakers, or other speakers for providing sound to the left and right ears of a user). If desired, input-output devices 22 may include haptic output devices (e.g., vibrating components), light-emitting diodes and other light sources, and other output components. Circuitry 14 may include wired and wireless communications circuitry 20 that allows head-mounted display 10 (e.g., control circuitry 12) to communicate with external equipment (e.g., remote controls, joysticks and other input controllers, portable electronic devices, computers, displays, etc.) and that allows signals to be conveyed between components (circuitry) at different locations in head-mounted display 10.

Figure 2:
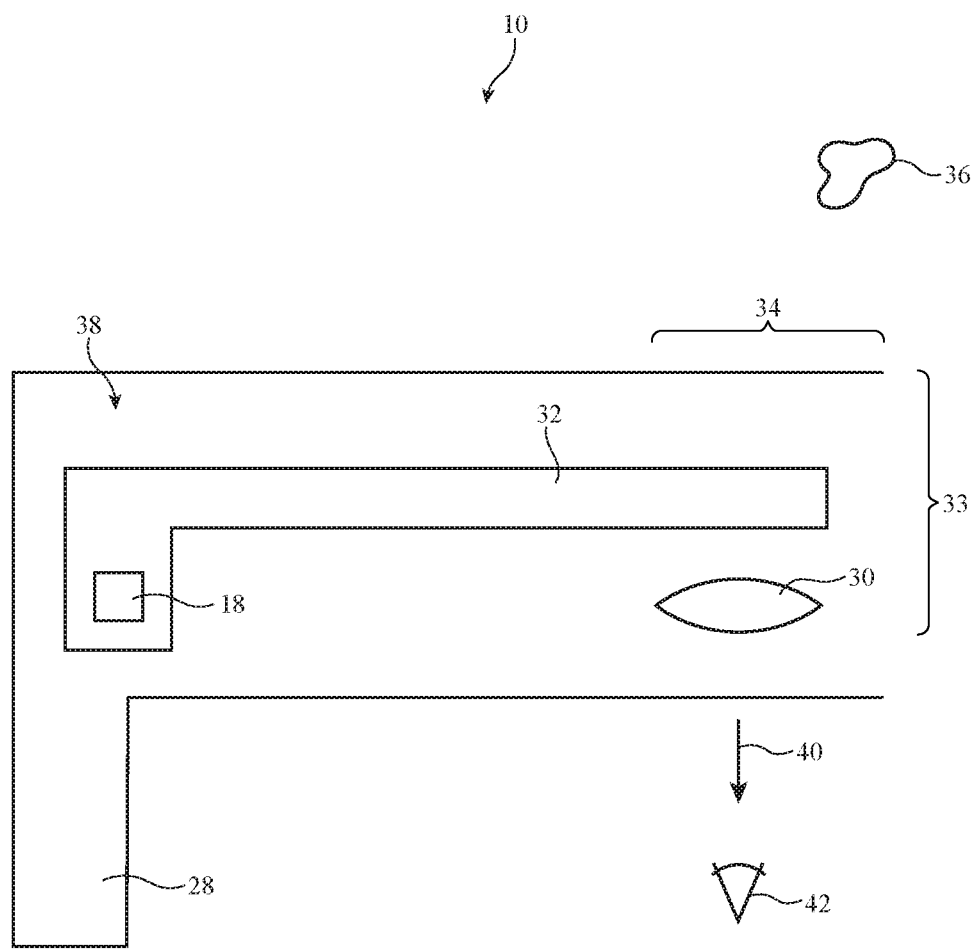
FIG. 2 is a diagram of an illustrative head-mounted device for a single eye in accordance with an embodiment.

The components of head-mounted display 10 may be supported by a head-mountable support structure such as illustrative support structure 28 of FIG. 2. Support structure 28, which may sometimes be referred to as a housing, may be configured to form a frame of a pair of glasses (e.g., left and right temples and other frame members), may be configured to form a helmet, may be configured to form a pair of goggles, or may have other head-mountable configurations.

Optical system 33 may be supported within support structure 28 and may be used to provide images from display(s) 18 to a user (see, e.g., the eyes of user 42 of FIG. 2). With one illustrative configuration, display(s) 18 may be located in outer (edge) portions 38 of optical system 33 and may have one or more pixel arrays that produce images. Light associated with the images may be coupled into waveguides in outer portions 38 using input coupler systems. The light within the waveguide may traverse intermediate regions 32. In central portion(s) 34 of system 33 (at the opposing ends of the waveguides from the input coupler systems and display(s) 18), output coupler systems formed from one or more output couplers may couple the light out of the waveguides. This light may pass through optional lenses 30 in direction 40 for viewing by user 42. Portion(s) 34 of optical system 33 may be transparent, so that user 42 may view external objects such as object 36 through this region of system 33 while system 33 overlays computer-generated content (image content generated by control circuitry 12 of FIG. 1) with objects such as object 36.

Figure 3:
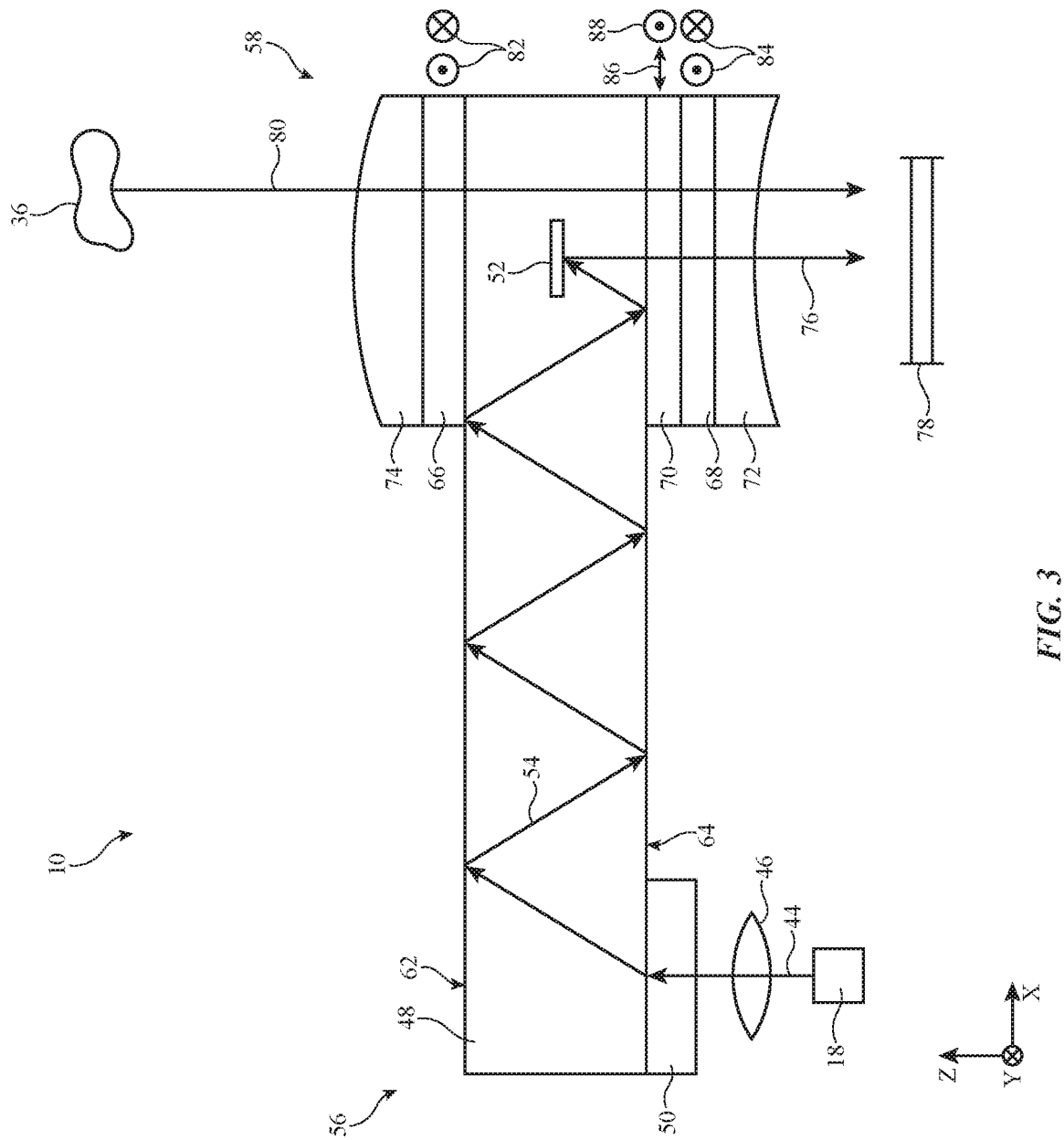
FIG. 3 is a top view of an illustrative display system for a head-mounted device having a waveguide and liquid crystal lenses in accordance with an embodiment.

FIG. 3 is a diagram of illustrative components that may be used in forming optical system 33 of device 10. The diagram of FIG. 3 includes components for one of the user's eyes. Device 10 may contain two sets of such components to present images to both of a user's eyes.

As shown in FIG. 3, device 10 may include one or more displays such as display(s) 18 for producing image light 44. Image light 44 may be generated by illuminating a reflective display containing an array of pixels or using any other desired display components. The images presented on the array of pixels may be conveyed through lens 46 to input coupler 50 (e.g., at end 56 of waveguide 48), which couples image light 44 into waveguide 48 (e.g., a planar waveguide). The image light coupled into waveguide 48 is confined within waveguide 48 in accordance with the principle of total internal reflection and travels towards output coupler 52, as indicated by light 54.

Output coupler 52 (e.g., at end 58 of waveguide 48) couples light 54 (image light) out of waveguide 48 and towards viewer 42 (an eye of a user), as output light (output image light) 76. Input coupler 50 and output coupler 52 may, for example, include structures such as Bragg gratings or other diffraction gratings that couple light into waveguides and that couple light out of the waveguides. Couplers 50 and 52 may be formed from volume holograms or other holographic coupling elements (e.g., thin layers of polymers and/or other optical coupler structures in which holographic patterns are recorded using lasers), prisms, angled transparent structures, lenses, or any other desired light coupling elements. Couplers 50 and 52 may have infinite focal lengths (e.g., couplers 50 and 52 may be plane-to-plane couplers) or may have associated finite focal lengths. Couplers 50 and/or 52 may be embedded within waveguide 48, formed on surface 62 of waveguide 48, and/or formed on surface 64 of waveguide 48.

Light 80 from external objects such as object 36 may pass through waveguide 48 (e.g., at end 58 of waveguide 48, within central region 34 of FIG. 2). Light 80 may sometimes be referred to herein as scene light, real world light, or world light. Output image light 76 and world light 80 may both be provided to eye box 78 (e.g., an area at which user 42 of FIG. 3 places their eye for viewing light from display(s) 18). Output image light 76 may be overlaid with world light 80 when viewed by the user at eye box 78.

One or more lenses may be used to direct output image light 76 towards eye box 78 with desired optical characteristics (e.g., with a desired optical power, focal length, image depth, etc.). It may be desirable to be able to adjust these optical characteristics over time (e.g., based on changes in sensor data gathered using sensors 26 of FIG. 1). Device 10 may include adjustable lens components such as adjustable lens components 66 and 68 of FIG. 3 that can be adjusted in real time by control circuitry 12.

Adjustable lens components 66 and 68, which may sometimes be referred to as adjustable lenses, adjustable lens systems, adjustable optical systems, adjustable lens devices, tunable lenses, etc., may contain electrically adjustable material such as liquid crystal material, volume Bragg gratings, or other electrically modulated material that may be adjusted to produce customized lenses. Each of components 66 and 68 may contain an array of electrodes that apply electric fields to portions of a layer of liquid crystal material or other voltage-modulated optical material with an electrically adjustable index of refraction (sometimes referred to as an adjustable lens power or adjustable phase profile). By adjusting the voltages of signals applied to the electrodes, the index of refraction profile of components 66 and 68 may be dynamically adjusted. This allows the size, shape, and location of the lenses formed within components 66 and 68 to be adjusted. An example in which adjustable lens components 66 and 68 are formed from layers of liquid crystal material is described herein as an example. Adjustable lens components 66 and 68 may therefore be referred to herein as liquid crystal lenses 66 and 68.

Control circuitry 12 may adjust liquid crystal lens 68 in real time to modulate output image light 76 with different desired optical characteristics over time (e.g., optical power, image depth, etc.). In general, it may be desirable to modulate output image light 76 without also modulating world light 80 (e.g., to adjust the optical characteristics of output image light 76 without also adjusting those optical characteristics of world light 80).

World light 80 passes through liquid crystal lens 66 prior to passing through waveguide 48. Control circuitry 12 may control liquid crystal lens 66 to exhibit an index of refraction profile that is the opposite (reverse) of the index of refraction profile provided by liquid crystal lens 66 (e.g., so that the optical power provided by liquid crystal lens 66 to world light 80 cancels out the optical power provided by liquid crystal lens 68 to world light 80). In this way, output image light 76 may be modulated by liquid crystal lens 68 whereas any modulation by liquid crystal lens 68 on world light 80 is canceled out by modulation from liquid crystal lens 66 (e.g., control circuitry 12 may modulate output image light 76 from display(s) 18 without modulating world light 80 from external object 36).

If desired, device 10 may include additional lenses such as lenses 74 and 72. As shown in FIG. 3, lens 74 may be mounted to liquid crystal lens 66 and lens 72 may be mounted to liquid crystal lens 68. Lens 72 may serve to bias the optical power of liquid crystal lens 68 and may sometimes be referred to herein as bias lens 72. For example, liquid crystal lens 68 may have an adjustable optical power of −1.5 D to 1.5 D and bias lens 72 may have an optical power of −1.5 D, which generates a combined optical power of −3 D to 0 D (e.g., because negative power is needed to bring an object at infinity closer to the eye). Lens 74 may be used to cancel the power of lens 72. Lenses 74 and 72 may include fixed and/or adjustable lenses. Lens 74 may be a convex lens whereas lens 72 is a concave lens in one suitable arrangement. This is merely illustrative. In general, lenses 74 and 72 may include any desired lens structures (e.g., concave lenses, convex lenses, Fresnel lenses, etc.). Lens 74 and/or lens 72 may be omitted if desired.

In some scenarios, it may be desirable to provide output image light 76 with a particular linear polarization. In one arrangement, a first linear polarizer is interposed between display(s) 18 and input coupler 50 for providing image light 44 with a first linear polarization and a second linear polarizer is interposed between lens 74 and waveguide 48 for providing world light 80 with a second linear polarization. However, in practice, linearly-polarized light does not maintain its linear polarization state as it propagates down the length of waveguide 48 from end 56 to output coupler 52 (e.g., due to phase shifts generated at each reflection off at surfaces 62 and 64 of waveguide 48). This may lead to undesirable artifacts such as double images from display(s) 18.

In order to maintain the linear polarization state of output image light 76 by the time the light reaches liquid crystal lens 68, a linear polarizer such as linear polarizer 70 may be interposed between surface 64 of waveguide 48 and liquid crystal lens 68. This allows light 54 to retain its polarization before passing through liquid crystal lens 68. Linear polarizer 70 also serves to linearly polarize world light 80. In the example of FIG. 3, linear polarizer 70 has an absorption axis that extends parallel to the X-axis (as shown by arrows 86) and a transmission axis that extends parallel to the Y-axis (e.g., as shown by arrow 88). Adhesive such as optically-transparent adhesive films or curable liquids may be used to attach lens 74 and liquid crystal lens 66, and likewise to attach waveguide 48 and linear polarizer 70, and/or to attach liquid crystal lens 68 to lens 72, etc. A small air gap may be maintained between surface 62 of waveguide 48 and liquid crystal lens 66 and surface 64 of waveguide 48 and linear polarizer 70 to generate an index of refraction variation and to allow total internal reflection of light 54 prior to interacting with out coupler 52 if desired. Other means may be used to generate a reflection interface at the waveguide surface as well (e.g. dielectric coatings, metallic coatings, material selection, etc.).

Liquid crystal lens 66 and liquid crystal lens 68 may each include a respective pair of liquid crystal cells. Each liquid crystal cell may include a corresponding layer of liquid crystal molecules. The pretilt angle of the liquid crystal molecules in the first liquid crystal cell of liquid crystal lens 66 may be opposite to the pretilt angle of the liquid crystal molecules in the second liquid crystal cell of liquid crystal lens 66. Similarly, the pretilt angle of the liquid crystal molecules in the first liquid crystal cell of lens 68 may be opposite to the pretilt angle of the liquid crystal molecules in the second liquid crystal cell of lens 68.

The pretilt angles of the liquid crystal molecules can be set by providing substrates within liquid crystal lenses 66 and 68 with particular rubbing directions (e.g., the liquid crystal molecules may contact the substrates and align along the corresponding rubbing directions). In the example of FIG. 3, the rubbing directions of liquid crystal lens 66 may extend parallel to the Y-axis (e.g., as shown by arrows 82). Similarly, the rubbing directions of liquid crystal lens 68 may also extend parallel to the Y-axis (e.g., as shown by arrows 84). In this way, the rubbing directions of liquid crystal lenses 66 and 68 may both extend parallel to the transmission axis of linear polarizer 88.

The example of FIG. 3 is merely illustrative. In general, the transmission axis of linear polarizer 70 and the rubbing directions of liquid crystal lenses 66 and 68 may extend parallel to any desired axes (e.g., such that the rubbing directions of liquid crystal lens 66 extend parallel/antiparallel to the rubbing directions of liquid crystal lens 68 and parallel to the transmission axis of linear polarizer 70). However, if care is not taken, off-axis light artifacts from liquid crystal lens 68 may exacerbate off-axis light artifacts from liquid crystal lens 66 to create undesirable image artifacts in world light 80 at eye box 78.

Figure 4:
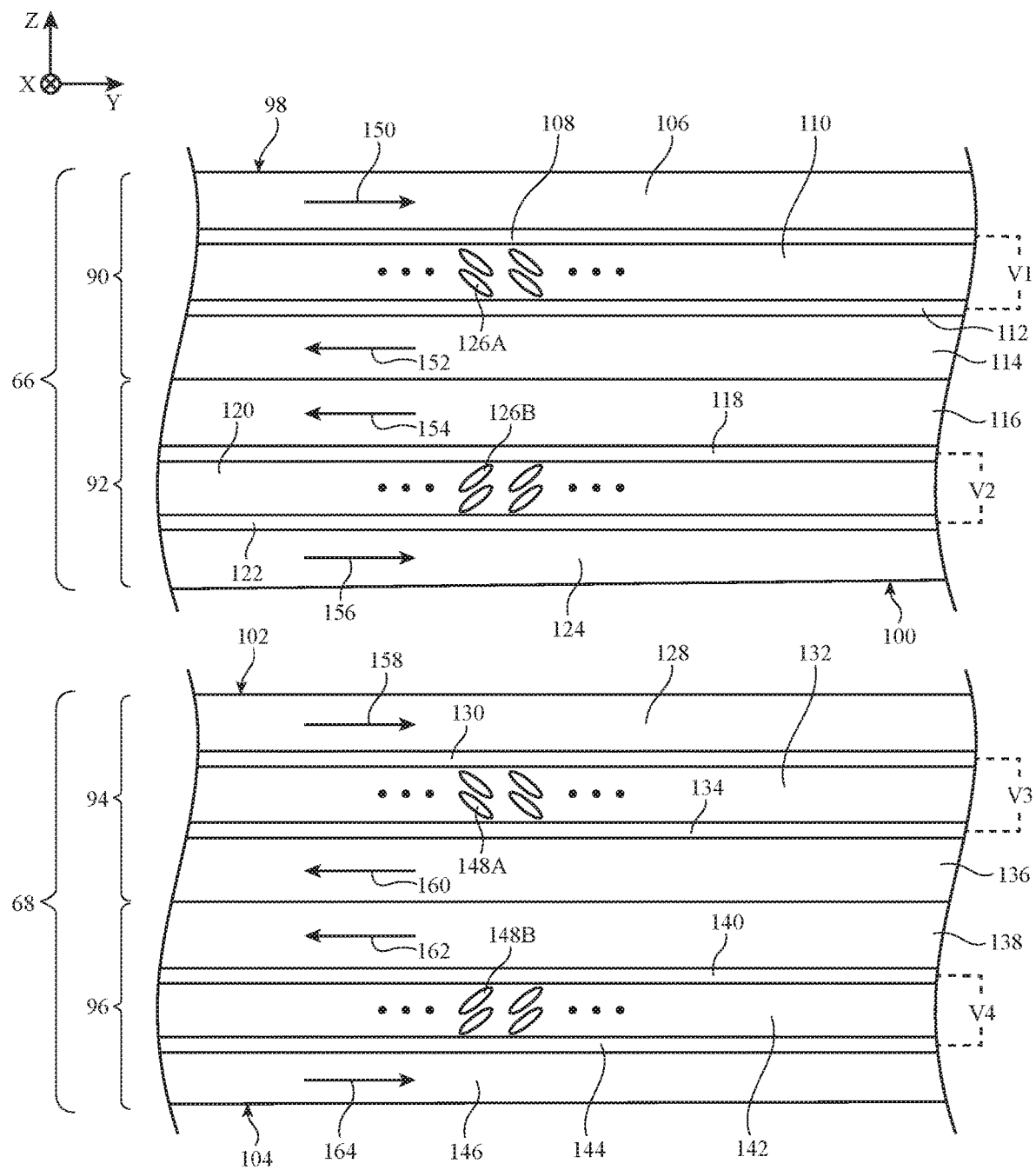
FIG. 4 is a top view of illustrative liquid crystal lenses of the type shown in FIG. 3 in accordance with an embodiment.

In order to mitigate these effects, the pretilt angles of the liquid crystal molecules in liquid crystal lens 66 may be opposite to the corresponding pretilt angles in liquid crystal lens 68 (e.g., with respect to waveguide 48). FIG. 4 is a cross-sectional diagram showing how the structures of liquid crystal lens 66 may be arranged antiparallel to the structures of liquid crystal lens 68.

As shown in FIG. 4, liquid crystal lens 66 may include a pair of liquid crystal cells such as liquid crystal cell 90 and liquid crystal cell 92. Liquid crystal cell 90 may have a layer of voltage-modulated optical material such as liquid crystal layer 110. Liquid crystal layer 110 may be interposed between transparent substrates such as upper substrate 106 and lower substrate 114. Substrates 106 and 114 may be formed from clear glass, sapphire or other transparent crystalline material, transparent plastic, thin coatings or films, other transparent layers, and/or combinations of these.

Liquid crystal cell 90 may have patterns of electrodes such as electrode layers 108 and 112 that can be supplied with signals from control circuitry 12 to produce desired voltages on liquid crystal cell 90. Electrode layer 108 may be patterned on substrate 106 whereas electrode layer 112 may be patterned on substrate 114. In one suitable arrangement, electrode layer 108 may include a common electrode (e.g., a blanket or plane of conductive material on substrate 106) whereas electrode layer 112 includes elongated electrodes (e.g., strip-shaped electrodes or finger electrodes) on substrate 114. The strip-shaped electrodes may extend parallel to the X-axis of FIG. 4, for example, and may sometimes be referred to herein as vertical electrodes 112.

At each location of the vertical electrodes 112, a desired voltage may be applied across liquid crystal layer 110 by supplying a first voltage to electrodes 112 and a second voltage (e.g., a ground voltage) to common electrode 108. The liquid crystal between the two electrode layers will receive an applied electric field with a magnitude that is proportional to the difference between the first and second voltages on the electrode layers. By controlling the voltages on electrodes 112 and 108, the index of refraction of liquid crystal layer 110 of liquid crystal cell 90 can be dynamically adjusted to produce customized lenses.

When an electric field is applied to the liquid crystals of layer 110, the liquid crystals change orientation. The speed at which a given liquid crystal material can be reoriented is limited by factors such as the thickness of layer 110. To increase the tuning speed of liquid crystal layer 110 while still achieving a suitable tuning range, liquid crystal lens 66 may include two or more liquid crystal cells stacked on top of one another. This type of arrangement is illustrated in FIG. 4.

As shown in FIG. 4, liquid crystal cell 92 of liquid crystal lens 66 may be stacked under liquid crystal cell 90. Liquid crystal cell 92 may include liquid crystal layer 120. Liquid crystal layer 120 may be interposed between transparent substrates such as upper substrate 116 and lower substrate 124. Upper substrate 116 of cell 92 may be mounted (attached) to lower substrate 114 of cell 90 (e.g., using optically transparent adhesive or other structures).

Substrates 116 and 124 may be formed from clear glass, sapphire or other transparent crystalline material, transparent plastic, thin coatings or films, other transparent layers, and/or combinations of these. Liquid crystal cell 92 may have patterns of electrodes such as electrode layers 118 and 122 that can be supplied with signals from control circuitry 12 to produce desired voltages on liquid crystal cell 92.

Electrode layer 118 may be patterned on substrate 116 whereas electrode layer 122 may be patterned on substrate 124. In one suitable arrangement, electrode layer 122 may include a common electrode (e.g., a blanket or plane of conductive material on substrate 124) whereas electrode layer 118 includes elongated electrodes (e.g., strip-shaped electrodes or finger electrodes) on substrate 116. The strip-shaped electrodes may extend parallel to the Y-axis of FIG. 4, for example, and may sometimes be referred to herein as horizontal electrodes 118.

At each location of the horizontal electrodes 118, a desired voltage may be applied across liquid crystal layer 120 by supplying a first voltage to electrodes 118 and a second voltage (e.g., a ground voltage) to common electrode 122. The liquid crystal between the two electrode layers will receive an applied electric field with a magnitude that is proportional to the difference between the first and second voltages on the electrodes. By controlling the voltages on electrodes 118 and 124, the index of refraction of liquid crystal layer 120 of liquid crystal cell 92 can be dynamically adjusted to produce customized lenses.

If desired, the rubbing direction and pretilt angles of liquid crystal cells 90 and 92 in lens 66 may be antiparallel with respect to each other. In particular, liquid crystal molecules 126A of upper liquid crystal cell 90 may have a first pretilt angle and liquid crystal molecules 126B of lower liquid crystal cell 92 may have a second pretilt angle that is opposite to the first pretilt angle (e.g., the optical axis of liquid crystal molecules 126B may be oriented at a positive angle with respect to the Z-axis of FIG. 4 whereas the optical axis of liquid crystal molecules 126A are oriented at an equal but negative angle with respect to the Z-axis when no voltage is applied to the electrodes). In other words, liquid crystal molecules 126B may have a positive pretilt angle with respect to the substrate plane whereas liquid crystal molecules 126A are in the same plane formed by the optical axis of liquid crystal molecules 126B and surface normal of the substrate, and have an equal but negative pretilt angle with respect to the substrate plane when no voltage is applied to the electrodes (e.g., liquid crystal molecules 126A and liquid crystal molecules 126B may have opposite pretilt angles).

In order to obtain these opposing pretilt angles, the upper substrate of each liquid crystal cell may be formed using opposite (antiparallel) rubbing directions and the lower substrate of each liquid crystal cell may be formed using opposite (antiparallel) rubbing directions. As shown in FIG. 4, substrates 106 and 124 of lens 66 may be have a first rubbing direction, as shown by arrows 150 and 156, whereas substrates 114 and 116 have a second rubbing direction, as shown by arrows 152 and 154 (e.g., a rubbing direction antiparallel to the rubbing direction associated with arrows 152 and 154). These rubbing directions may, for example, extend parallel/antiparallel to arrows 82 of FIG. 3.

Overlapping portions of liquid crystal layers 110 and 120 in lens 66 may be controlled using the same or different voltages to achieve the desired index of refraction at that portion of lens 66. For example, a first voltage V1 may be applied across a given portion of upper liquid crystal layer 110 whereas a second voltage V2 may be applied across that portion of lower liquid crystal layer 120. Voltages V1 and V2 may be different or may be the same. Control circuitry 12 may determine the magnitudes and ratio of V1 to V2 based on the desired index of refraction at that portion of the liquid crystal lens 66 (e.g., to provide lens 66 with an opposite optical power to lens 68).

Surface 100 of substrate 124 may be mounted to surface 62 of waveguide 48 of FIG. 3. If desired, a small air gap may be maintained between substrate 124 and surface 62 (e.g., to allow for and index of refraction difference with waveguide 48 that enables total internal reflection within waveguide 48). Substrate 124 may be considered to be "mounted" to (at) waveguide 48 even when this small air gap is present (e.g., no adhesive may be present between the waveguide and the liquid crystal lenses closest to the waveguide). Lens 74 of FIG. 3 may be mounted to surface 98 of substrate 106. Surface 102 of liquid crystal lens 68 may be mounted to surface 64 of waveguide 48. Similarly, surface 102 may be considered to be "mounted" to waveguide 48 even when a small air gap is present between liquid crystal lens 68 and waveguide 48 to allow for total internal reflection. Waveguide 48 has been omitted from FIG. 4 for the sake of clarity. The pretilt angles of the liquid crystal molecules in lens 68 may be opposite to the corresponding pretilt angles of the liquid crystal molecules in lens 66 with respect to waveguide 48 (e.g., the liquid crystal molecules in the liquid crystal layer with a certain single electrode direction in lens 66 may have pretilt angles opposite to the liquid crystal layer with the same electrode direction in lens 68, etc.).

As shown in FIG. 4, liquid crystal lens 68 may include a pair of liquid crystal cells such as liquid crystal cell 94 and liquid crystal cell 96. Liquid crystal cell 94 may have liquid crystal layer 132. Liquid crystal layer 132 may be interposed between transparent substrates such as upper substrate 128 and lower substrate 136. Substrates 128 and 136 may be formed from clear glass, sapphire or other transparent crystalline material, transparent plastic, thin coatings or films, other transparent layers, and/or combinations of these.

Liquid crystal cell 94 may have patterns of electrodes such as electrode layers 130 and 134 that can be supplied with signals from control circuitry 12 to produce desired voltages on liquid crystal cell 94. Electrode layer 130 may be patterned on substrate 128 whereas electrode layer 134 may be patterned on substrate 136. In one suitable arrangement, electrode layer 130 may include a common electrode (e.g., a blanket or plane of conductive material on substrate 128) whereas electrode layer 134 includes elongated electrodes (e.g., strip-shaped electrodes or finger electrodes) on substrate 136. The strip-shaped electrodes may extend parallel to the Y-axis of FIG. 4, for example, and may sometimes be referred to herein as horizontal electrodes 134.

At each location of the horizontal electrodes 134, a desired voltage may be applied across liquid crystal layer 132 by supplying a first voltage to electrodes 134 and a second voltage (e.g., a ground voltage) to common electrode 130. The liquid crystal between the two electrode layers will receive an applied electric field with a magnitude that is proportional to the difference between the first and second voltages on the electrodes. By controlling the voltages on electrodes 130 and 134, the index of refraction of liquid crystal layer 132 of liquid crystal cell 94 can be dynamically adjusted to produce customized lenses.

As shown in FIG. 4, liquid crystal cell 96 of liquid crystal lens 68 may be stacked under liquid crystal cell 94. Liquid crystal cell 96 may include liquid crystal layer 142. Liquid crystal layer 142 may be interposed between transparent substrates such as upper substrate 138 and lower substrate 146. Upper substrate 138 of cell 96 may be mounted (attached) to lower substrate 136 of cell 94 (e.g., using optically transparent adhesive or other structures).

Substrates 138 and 146 may be formed from clear glass, sapphire or other transparent crystalline material, transparent plastic, thin coatings or films, other transparent layers, and/or combinations of these. Liquid crystal cell 96 may have patterns of electrodes such as electrode layers 140 and 144 that can be supplied with signals from control circuitry 12 to produce desired voltages on liquid crystal cell 96. Electrode layer 140 may be patterned on substrate 138 whereas electrode layer 144 may be patterned on substrate 146. In one suitable arrangement, electrode layer 144 may include a common electrode (e.g., a blanket or plane of conductive material on substrate 146) whereas electrode layer 140 includes elongated electrodes (e.g., strip-shaped electrodes or finger electrodes) on substrate 138. The strip-shaped electrodes may extend parallel to the X-axis of FIG. 4, for example, and may sometimes be referred to herein as vertical electrodes 140.

At each location of the vertical electrodes 140, a desired voltage may be applied across liquid crystal layer 142 by supplying a first voltage to electrodes 140 and a second voltage (e.g., a ground voltage) to common electrode 144. The liquid crystal between the two electrode layers will receive an applied electric field with a magnitude that is proportional to the difference between the first and second voltages on the electrodes. By controlling the voltages on electrodes 140 and 144, the index of refraction of liquid crystal layer 142 of liquid crystal cell 96 can be dynamically adjusted to produce customized lenses.

If desired, the rubbing direction and pretilt angles of liquid crystal cells 94 and 96 in lens 68 may be antiparallel or opposite with respect to each other. In particular, liquid crystal molecules 148A of upper liquid crystal cell 94 may have a first pretilt angle and liquid crystal molecules 148B of lower liquid crystal cell 96 may have a second pretilt angle that is opposite to the first pretilt angle (e.g., the optical axis of liquid crystal molecules 148B may be oriented at a positive angle with respect to the Z-axis of FIG. 4 whereas the optical axis of liquid crystal molecules 148A are oriented at an equal but negative angle with respect to the Z-axis when no voltage is applied to the electrodes).

In order to obtain these opposing pretilt angles, the upper substrate of each liquid crystal cell may be formed using opposite rubbing directions and the lower substrate of each liquid crystal cell may be formed using opposite rubbing directions. As shown in FIG. 4, substrates 128 and 146 of lens 68 may be have a first rubbing direction, as shown by arrows 158 and 164, whereas substrates 136 and 138 have a second rubbing direction, as shown by arrows 160 and 162 (e.g., a rubbing direction antiparallel to the rubbing direction associated with arrows 158 and 164). These rubbing directions may, for example, extend parallel/antiparallel to arrows 84 of FIG. 3.

In this way, the rubbing direction of substrate 106 of lens 66 may be parallel to the rubbing direction of substrate 124 of lens 66 and substrates 128 and 146 of lens 68. Similarly, the rubbing direction of substrate 106 of lens 66 may be antiparallel to the rubbing direction of substrates 114 and 116 of lens 66 and substrates 136 and 138 of lens 68. In addition, the pretilt angle of liquid crystal molecules 126B in lens 66 may be opposite to the pretilt angle of liquid crystal molecules 148A. Similarly, the pretilt angle of liquid crystal molecules 126A in lens 66 may be opposite to the pretilt angle of liquid crystal molecules 148B. In other words, the pretilt angles of liquid crystal lens 66 may be opposite to the corresponding pretilt angles of liquid crystal lens 68 about waveguide 48.

Overlapping portions of liquid crystal layers 132 and 142 in lens 68 may be controlled using the same or different voltages to achieve the desired index of refraction at that portion of lens 68. For example, a first voltage V3 may be applied across a given portion of upper liquid crystal layer 132 whereas a second voltage V4 may be applied across that portion of lower liquid crystal layer 142. Voltages V3 and V4 may be different or may be the same. Control circuitry 12 may determine the ratio of V3 to V4 based on the desired index of refraction at that portion of the liquid crystal lens 66 (e.g., based on the disposition of the user's eyes 16). This may serve to configure lens 68 to provide output image light 76 (FIG. 3) with desired optical characteristics (e.g., optical power, image depth, etc.). Control circuitry 12 may determine voltages V1 and V2 of lens 66 to control lens 66 to reverse the optical characteristics imparted on world light 80 by lens 68 (e.g., control circuitry 12 may provide voltages V1 and V2 to counteract the optical characteristics of lens 68).

The example of FIG. 4 is merely illustrative. If desired, electrode layers 108 and 122 of lens 66 may be formed using strip-shaped electrodes (e.g., where one electrode layer is formed using horizontal strips and the other is formed using vertical strips) whereas electrode layers 112 and 118 are formed using common (planar) electrodes. Similarly, if desired, electrode layers 130 and 144 of lens 68 may be formed using strip-shaped electrodes (e.g., where one electrode layer is formed using horizontal strips and the other is formed using vertical strips) whereas electrode layers 134 and 140 are formed using common (planar) electrodes. Rubbing directions 150, 152, 154, 156, 158, 160, 162, and 164 may extend parallel to any desired axis (e.g., as long as rubbing directions 150, 156, 158, and 164 are parallel to each other and antiparallel to rubbing directions 152, 154, 160, and 162). When arranged in this way, lens 68 may modulate output image light 76 provided to eye box 78 (FIG. 3) while preventing light artifacts from lens 66 from adding with light artifacts from lens 68.

Figure 5:
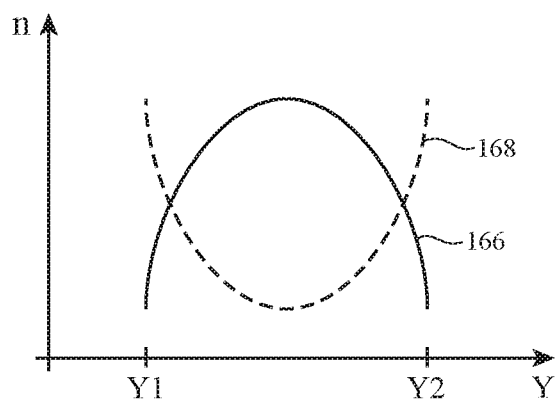
FIGS. 5 and 6 are graphs showing how illustrative liquid crystal lenses may be adjusted so that their refractive indices vary as a function of position to produce desired lens profiles in accordance with an embodiment.
Figure 6:
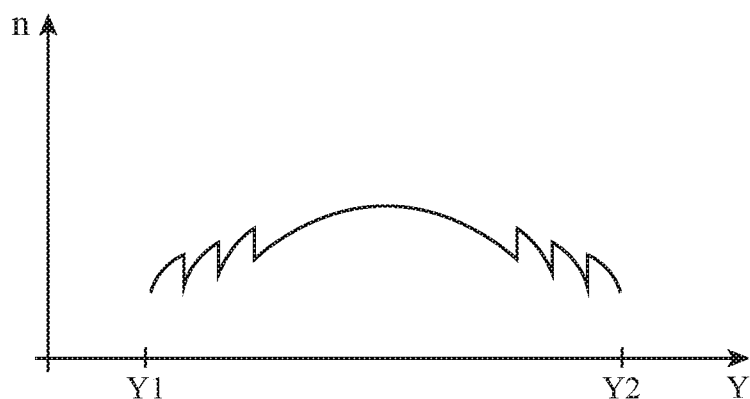

FIGS. 5 and 6 show examples of illustrative index-of-refraction profiles that may be generated by liquid crystal lenses 66 and/or 68 of FIG. 4. In the example of FIG. 5, curve 166 plots an exemplary refractive index n generated for liquid crystal lens 66. As shown by curve 166, refractive index n has been varied continuously between peripheral lens edges Y1 and Y2. This may provide liquid crystal lens 66 with a desired optical power and/or any other desired optical characteristics.

Curve 168 plots an exemplary refractive index n generated for liquid crystal lens 68. As shown by curve 168, refractive index n has been varied inversely to the refractive index associated with curve 166 (e.g., refractive index n for lens 66 may be relatively low at locations where refractive index n for lens 68 is relatively high and refractive index n for lens 66 may be relatively high at locations where refractive index n for lens 68 is relatively low). This may, for example, provide liquid crystal lens 68 with an optical power opposite to the optical power of liquid lens 66. In this way, the optical power of lens 68 may cancel out the optical power applied to world light 80 (FIG. 3) by lens 66 so that the world light is not modulated by the time it reaches eye box 78. Control circuitry 12 may adjust curve 166 over time (e.g., by adjusting voltages V1 and V2 of FIG. 4) and may adjust curve 168 to counteract these changes (e.g., by adjusting voltages V3 and V4 of FIG. 4).

In the example of FIG. 6, refractive index n has been varied discontinuously to produce an index-of-refraction profile appropriate for forming a Fresnel lens. When the index-of-refraction profile of FIG. 6 is applied to lens 66, an inverse profile may be applied to lens 68, for example. These examples are merely illustrative. If desired, other suitable index-of-refraction profiles may be used using adjustable lens components of the type shown in FIGS. 3 and 4.

In the example of FIG. 4, liquid crystal lenses 66 and 68 include electrodes that extend in multiple directions (e.g., horizontal electrodes 118 and 134 and vertical electrodes 112 and 140). FIGS. 5 and 6 illustrate phase profile modulation for lenses 66 and 68 along only a single direction for the sake of simplicity (e.g., the Y-dimension of FIGS. 3-6). In general, curves 166 and 168 of FIG. 5 and the curve of FIG. 6 may lie on three-dimensional index-of-refraction surfaces that are controlled/adjusted using control circuitry 12 (e.g., the index of refraction of lenses 66 and 68 may be actively varied in both the X and Y dimensions of FIGS. 3-6). In another suitable arrangement, liquid crystal lenses 66 and 68 of FIG. 4 may include electrodes that extend only in one direction, allowing lenses 66 and 68 to modulate their phase profiles only along one direction.

Figure 7:
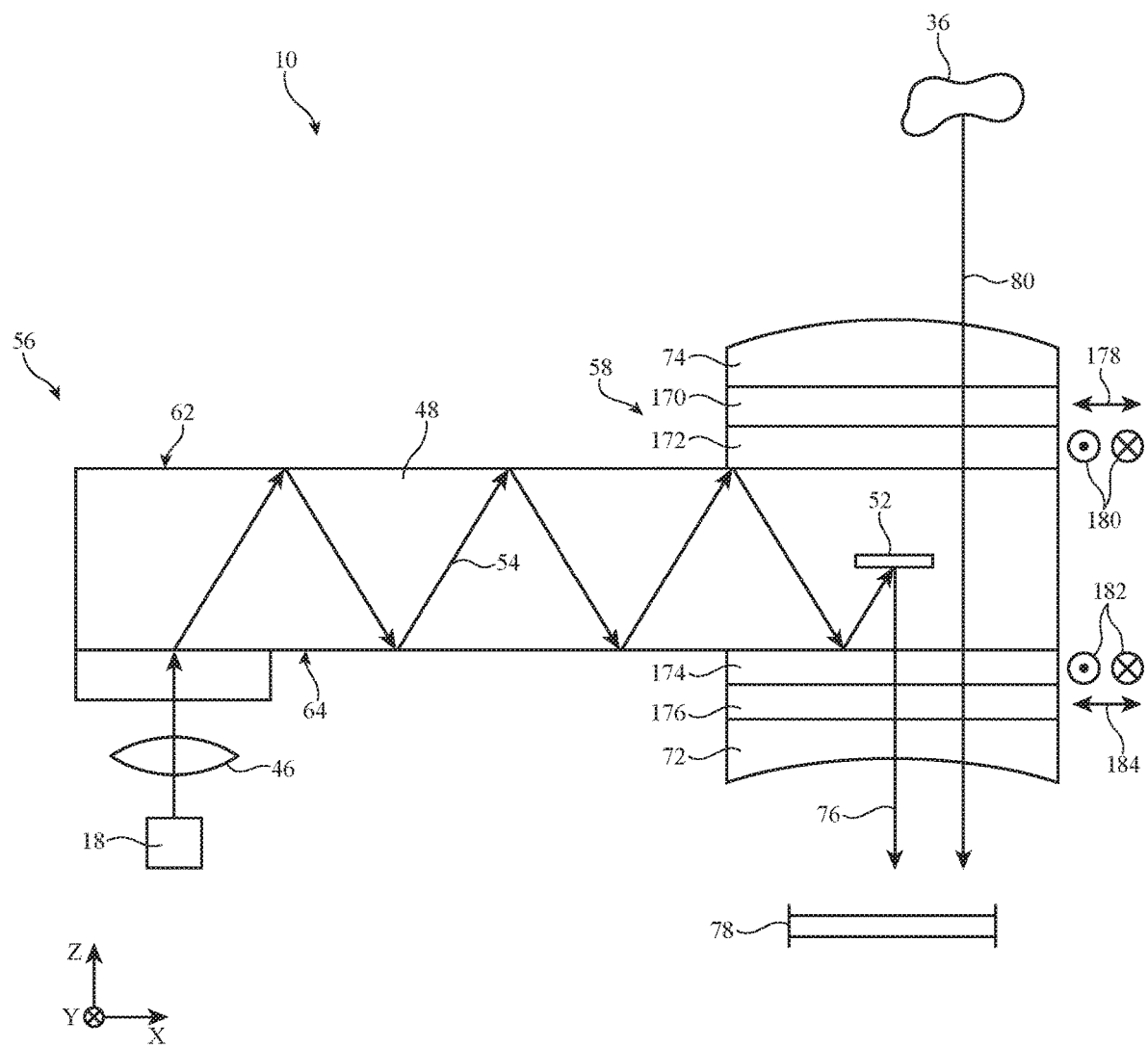
FIG. 7 is a top view of an illustrative display system for a head-mounted device having a waveguide and multiple pairs of liquid crystal lenses for covering multiple polarizations in accordance with an embodiment.

In the example of FIGS. 3 and 4, light of a single linear polarization is provided to eye box 78. It may sometimes be desirable to be able to provide light of additional polarizations to eye box 78. FIG. 7 is a diagram showing how waveguide 48 may be used to provide unpolarized light to eye box 78.

As shown in FIG. 7, four liquid crystal lenses such as liquid crystal lenses 170, 172, 174, and 176 may be mounted adjacent to waveguide 48 at end 58. Liquid crystal lens 172 may be mounted to of waveguide 48. Liquid crystal lens 170 may be mounted to liquid crystal lens 172. Optional lens 74 may be mounted to liquid crystal lens 170. Liquid crystal lens 174 may be mounted to waveguide 48. Liquid crystal lenses 172 and 174 may be referred to as being "mounted" to waveguide 48 even though small air gaps may be present between the liquid crystal lenses and the waveguide to maintain total internal reflection within the waveguide. Liquid crystal lens 176 may be mounted to liquid crystal lens 174. Optional lens 72 may be mounted to liquid crystal lens 176. Linear polarizer 70 of FIG. 3 may be omitted in this example, allowing unpolarized output image light 76 and world light 80 to pass to eye box 78.

Liquid crystal lenses 174 and 176 may be used to provide output image light 76 with desired optical power. Liquid crystal lenses 170 and 172 may be used to cancel out the optical power provided to world light 80 by lenses 174 and 176 (e.g., so that world light 80 is not modulated by the time it reaches eye box 78). For example, control circuitry 12 may control liquid crystal lens 172 to cancel out the optical power provided by liquid crystal lens 174 (e.g., by providing lens 172 with an inverse index-of-refraction profile relative to that provided to lens 174). Similarly, control circuitry 12 may control liquid crystal lens 170 to cancel out the optical power provided by liquid crystal lens 176 (e.g., by providing lens 170 with an inverse index-of-refraction profile relative to that provided to lens 176).

The pretilt angles of the liquid crystal molecules and the rubbing directions of the substrates in lenses 170 and 176 may extend along orthogonal directions relative to the pretilt angles of the liquid crystal molecules and the rubbing directions of the substrates in lenses 172 and 174. For example, the rubbing directions in lens 172 may extend parallel to the Y-axis of FIG. 7, as shown by arrows 180. Similarly, the rubbing directions in lens 174 may also extend parallel to the Y-axis, as shown by arrows 182. At the same time, the rubbing directions in lens 170 may extend parallel to the X-axis, as shown by arrows 178. Similarly, the rubbing directions in lens 176 may also extend parallel to the X-axis, as shown by arrows 184. This may allow the lenses to modulate output image light 76 with multiple polarizations and to pass un-modulated world light 80 to eye box 78 with multiple polarizations.

The example of FIG. 7 is merely illustrative. In general, the rubbing directions of lenses 170, 172, 174, and 176 may extend parallel to any desired axes (e.g., such that the rubbing directions of liquid crystal lens 172 extend along an axis parallel/antiparallel to the rubbing directions of liquid crystal lens 174 and orthogonal to the rubbing directions of liquid crystal lenses 176 and 170).

Figure 8:
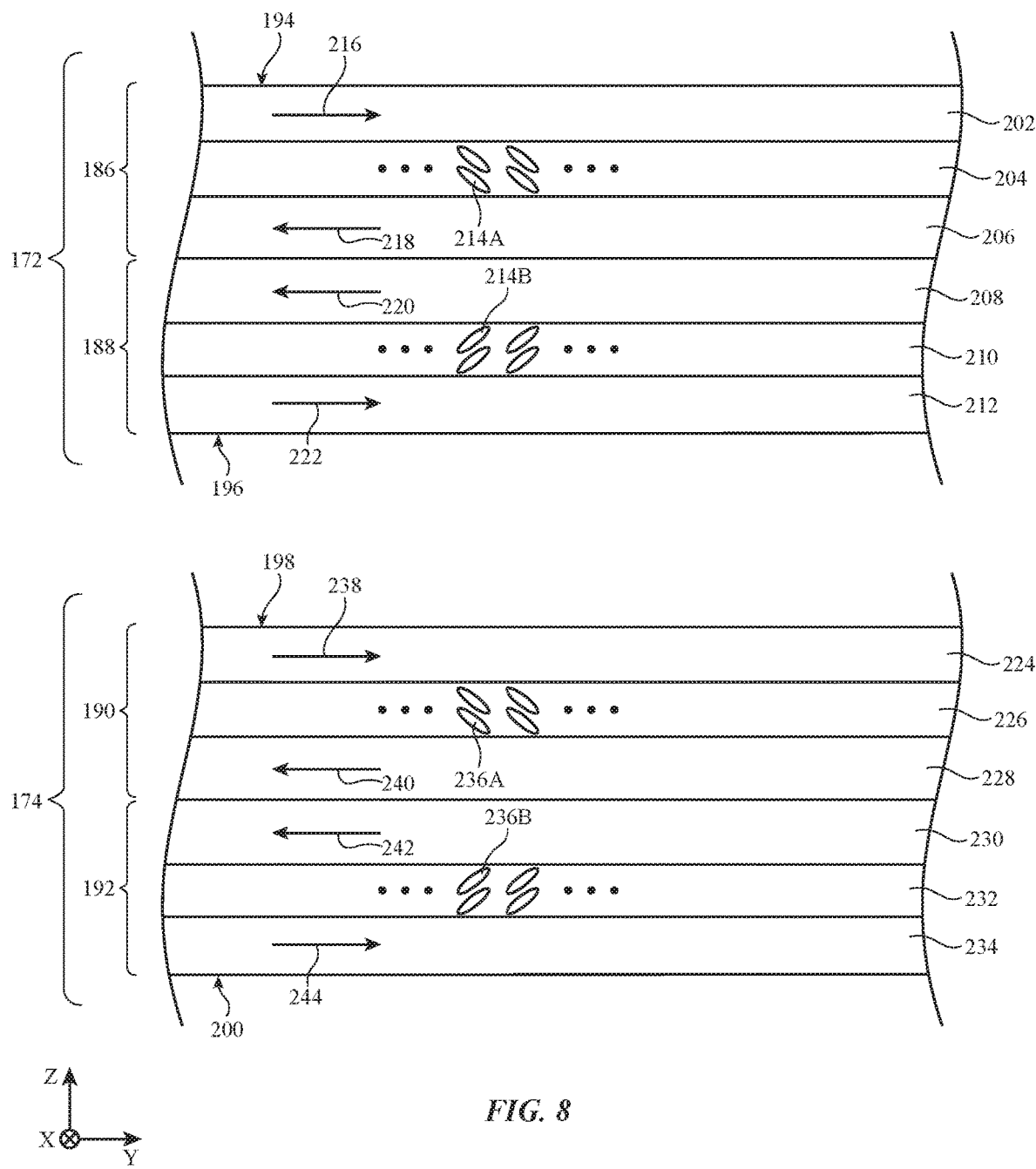
FIGS. 8 and 9 are top views of illustrative liquid crystal lenses of the type shown in FIG. 7 in accordance with an embodiment.

FIG. 8 is a cross-sectional diagram showing how the structures of liquid crystal lens 172 may be arranged anti-parallel to the structures of liquid crystal lens 174. As shown in FIG. 8, liquid crystal lens 172 may include a pair of liquid crystal cells such as liquid crystal cell 186 and liquid crystal cell 188. Liquid crystal cell 186 may include liquid crystal layer 204. Liquid crystal layer 204 may be interposed between transparent substrates such as upper substrate 202 and lower substrate 206.

Liquid crystal cell 188 of liquid crystal lens 172 may be stacked under liquid crystal cell 186. Liquid crystal cell 188 may include liquid crystal layer 210. Liquid crystal layer 210 may be interposed between transparent substrates such as upper substrate 208 and lower substrate 212. The electrode layers of lenses 172 and 174 have been omitted from FIG. 8 for the sake of clarity. In general, lenses 172 and 174 may be provided with electrode layers similar to electrode layers 108, 112, 118, and 122 of FIG. 4.

The rubbing directions and pretilt angle of liquid crystal cell 186 may be antiparallel to the rubbing directions and pretilt angle of liquid crystal cell 188. In particular, liquid crystal molecules 214A of upper liquid crystal cell 186 may have a first pretilt angle and liquid crystal molecules 214B of lower liquid crystal cell 188 may have a second pretilt angle that is opposite to the first pretilt angle. Similarly, the upper substrate of each liquid crystal cell in lens 172 may be formed using opposite rubbing directions and the lower substrate of each liquid crystal cell may be formed using opposite rubbing directions.

As shown in FIG. 8, substrates 202 and 212 of lens 172 may be have a first rubbing direction, as shown by arrows 216 and 222, whereas substrates 206 and 208 have a second rubbing direction, as shown by arrows 218 and 220 (e.g., a rubbing direction antiparallel to the rubbing direction associated with arrows 216 and 222). These rubbing directions may, for example, extend parallel/antiparallel to arrows 180 of FIG. 7.

Surface 196 of substrate 212 may be mounted to surface 62 of waveguide 48 of FIG. 7 (e.g., allowing for a small air gap between substrate 212 and waveguide 48). Lens 170 of FIG. 7 may be mounted to surface 194 of substrate 202. Surface 198 of lens 174 may be mounted to surface 64 of waveguide 48. Waveguide 48 has been omitted from FIG. 8 for the sake of clarity. The pretilt angles of the liquid crystal molecules in lens 174 may be opposite to the corresponding pretilt angles of the liquid crystal molecules in lens 172 about waveguide 48 (e.g., the liquid crystal molecules in the liquid crystal layer with a certain single electrode direction in lens 174 may have pretilt angles opposite to the liquid crystal layer with the same electrode direction in lens 172, etc.).

As shown in FIG. 8, lens 174 may include a pair of liquid crystal cells such as liquid crystal cell 190 and liquid crystal cell 192. Liquid crystal cell 190 may include liquid crystal layer 226. Liquid crystal layer 226 may be interposed between transparent substrates such as upper substrate 224 and lower substrate 228. Liquid crystal cell 192 of liquid crystal lens 174 may be stacked under liquid crystal cell 190. Liquid crystal cell 192 may include liquid crystal layer 232. Liquid crystal layer 232 may be interposed between transparent substrates such as upper substrate 230 and lower substrate 234.

The rubbing directions and pretilt angle of liquid crystal cell 190 may be antiparallel or opposite to the rubbing directions and pretilt angle of liquid crystal cell 192. In particular, liquid crystal molecules 236A of upper liquid crystal cell 190 may have a first pretilt angle and liquid crystal molecules 236B of lower liquid crystal cell 192 may have a second pretilt angle that is opposite to the first pretilt angle. Similarly, the upper substrate of each liquid crystal cell in lens 174 may be formed using opposite rubbing directions and the lower substrate of each liquid crystal cell may be formed using opposite rubbing directions.

As shown in FIG. 8, substrates 224 and 234 of lens 174 may be have a first rubbing direction, as shown by arrows 238 and 244, whereas substrates 228 and 230 have a second rubbing direction, as shown by arrows 240 and 242 (e.g., a rubbing direction antiparallel to the rubbing direction associated with arrows 238 and 244). These rubbing directions may, for example, extend parallel/antiparallel to arrows 182 of FIG. 7.

In this way, the rubbing direction of substrate 202 of lens 172 may be parallel to the rubbing direction of substrate 212 of lens 172 and substrates 224 and 234 of lens 174. Similarly, the rubbing direction of substrate 202 of lens 172 may be antiparallel to the rubbing direction of substrates 206 and 208 of lens 172 and substrates 228 and 230 of lens 174. In addition, the pretilt angle of liquid crystal molecules 214B in lens 172 may be opposite to the pretilt angle of liquid crystal molecules 236A. Similarly, the pretilt angle of liquid crystal molecules 214A in lens 66 may be opposite to the pretilt angle of liquid crystal molecules 236B. In other words, the pretilt angles of liquid crystal lens 172 may be opposite to the corresponding pretilt angles of liquid crystal lens 174 about waveguide 48 (e.g., as long as the liquid crystal cells have the same electrode directions).

The example of FIG. 8 is merely illustrative. Rubbing directions 216, 218, 220, 222, 238, 240, 242, and 244 may extend parallel to any desired axis (e.g., so long as rubbing directions 216, 222, 238, and 244 are parallel to each other, antiparallel to rubbing directions 218, 220, 240, and 242, and orthogonal to the rubbing directions of lenses 170 and 176 of FIG. 7). When arranged in this way, lens 174 may modulate output image light 76 provided to eye box 78 (FIG. 7) while preventing light artifacts from lens 174 from adding with light artifacts from lens 172.

Figure 9:
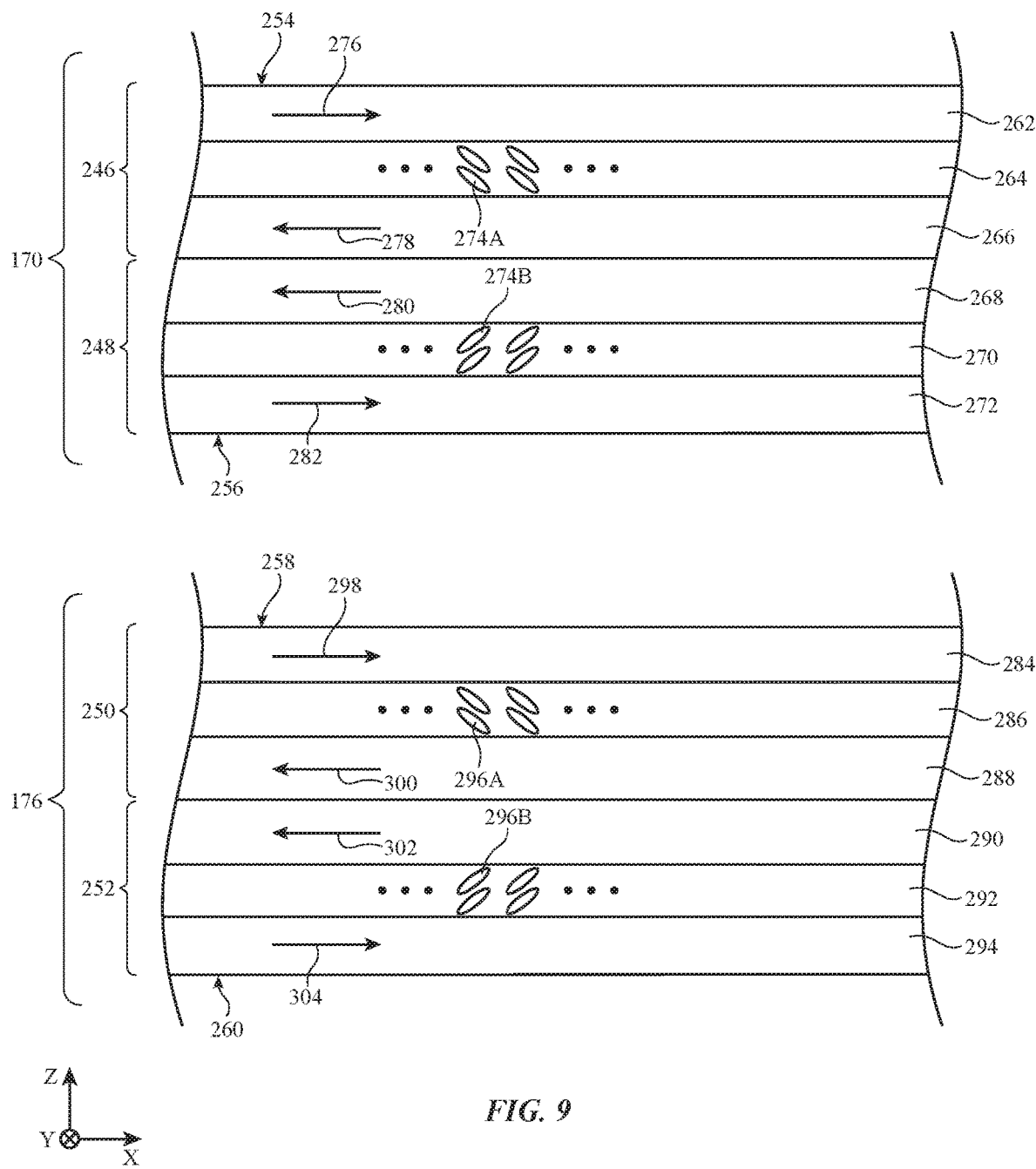

FIG. 9 is a cross-sectional diagram showing how the structures of liquid crystal lens 170 may be arranged antiparallel to the structures of liquid crystal lens 176 (e.g., the plane of the page of FIG. 9 my lie in the X-Z plane of FIGS. 3-8). As shown in FIG. 9, liquid crystal lens 170 may include a pair of liquid crystal cells such as liquid crystal cell 246 and liquid crystal cell 248. Liquid crystal cell 246 may include liquid crystal layer 264. Liquid crystal layer 264 may be interposed between transparent substrates such as upper substrate 262 and lower substrate 266.

Liquid crystal cell 248 of liquid crystal lens 170 may be stacked under liquid crystal cell 246. Liquid crystal cell 248 may include liquid crystal layer 270. Liquid crystal layer 270 may be interposed between transparent substrates such as upper substrate 268 and lower substrate 272. The electrode layers of lenses 170 and 176 have been omitted from FIG. 9 for the sake of clarity. If desired, lenses 170 and 176 may be provided with electrode layers similar to electrode layers 108, 112, 118, and 122 of FIG. 4.

The rubbing directions and pretilt angle of liquid crystal cell 246 may be antiparallel to the rubbing directions and pretilt angle of liquid crystal cell 248. In particular, liquid crystal molecules 274A of upper liquid crystal cell 246 may have a first pretilt angle and liquid crystal molecules 274B of lower liquid crystal cell 248 may have a second pretilt angle that is opposite to the first pretilt angle (e.g., orthogonal to the pretilt angles of liquid crystal molecules 214A, 214B, 236A, and 236B of FIG. 8). Similarly, the upper substrate of each liquid crystal cell in lens 170 may be formed using opposite rubbing directions and the lower substrate of each liquid crystal cell may be formed using opposite rubbing directions.

As shown in FIG. 9, substrates 262 and 272 of lens 170 may be have a first rubbing direction, as shown by arrows 276 and 282, whereas substrates 266 and 268 have a second rubbing direction, as shown by arrows 278 and 280 (e.g., a rubbing direction antiparallel to the rubbing direction associated with arrows 276 and 282). These rubbing directions may, for example, extend parallel/antiparallel to arrows 178 of FIG. 7 and orthogonal to the rubbing directions of lenses 172 and 174 of FIG. 8.

Surface 256 of substrate 272 may be mounted to surface 194 of lens 172 (FIG. 8). Lens 74 of FIG. 7 may be mounted to surface 254 of substrate 262. Surface 258 of lens 176 may be mounted to surface 200 of lens 174 (FIG. 8). Lens 72 of FIG. 7 may be mounted to surface 260 of substrate 294. Waveguide 48, lens 172, and lens 174 have been omitted from FIG. 9 for the sake of clarity. The pretilt angles of the liquid crystal molecules in lens 170 may be opposite to the corresponding pretilt angles of the liquid crystal molecules in lens 176 about waveguide 48 (e.g., the liquid crystal molecules with a certain single electrode direction in the liquid crystal layer may have pretilt angles opposite to the liquid crystal layer with the same electrode direction in lens 170, etc.).

As shown in FIG. 9, lens 176 may include a pair of liquid crystal cells such as liquid crystal cell 250 and liquid crystal cell 252. Liquid crystal cell 250 may include liquid crystal layer 286. Liquid crystal layer 286 may be interposed between transparent substrates such as upper substrate 284 and lower substrate 288. Liquid crystal cell 252 of liquid crystal lens 176 may be stacked under liquid crystal cell 250. Liquid crystal cell 252 may include liquid crystal layer 292. Liquid crystal layer 292 may be interposed between transparent substrates such as upper substrate 290 and lower substrate 294.

The rubbing directions and pretilt angle of liquid crystal cell 250 may be antiparallel or opposite to the rubbing directions and pretilt angle of liquid crystal cell 252. In particular, liquid crystal molecules 296A of upper liquid crystal cell 250 may have a first pretilt angle and liquid crystal molecules 296B of lower liquid crystal cell 252 may have a second pretilt angle that is opposite to the first pretilt angle. Similarly, the upper substrate of each liquid crystal cell in lens 176 may be formed using opposite rubbing directions and the lower substrate of each liquid crystal cell may be formed using opposite rubbing directions.

As shown in FIG. 9, substrates 284 and 294 of lens 176 may be have a first rubbing direction, as shown by arrows 298 and 304, whereas substrates 288 and 290 have a second rubbing direction, as shown by arrows 300 and 302 (e.g., a rubbing direction antiparallel to the rubbing direction associated with arrows 298 and 304). These rubbing directions may, for example, extend parallel/antiparallel to arrows 184 of FIG. 7 and orthogonal to the rubbing directions of lenses 172 and 174 of FIG. 8.

In this way, the rubbing direction of substrate 262 of lens 170 may be parallel to the rubbing direction of substrate 272 of lens 170 and substrates 284 and 294 of lens 176. Similarly, the rubbing direction of substrate 262 of lens 170 may be antiparallel to the rubbing direction of substrates 266 and 268 of lens 170 and substrates 288 and 290 of lens 176. In addition, the pretilt angle of liquid crystal molecules 274B in lens 170 may be opposite to the pretilt angle of liquid crystal molecules 296A. Similarly, the pretilt angle of liquid crystal molecules 274A in lens 170 may be opposite to the pretilt angle of liquid crystal molecules 296B. In other words, the pretilt angles of liquid crystal lens 170 may be opposite to the corresponding pretilt angles of liquid crystal lens 176 about waveguide 48.

The example of FIG. 9 is merely illustrative. Rubbing directions 276, 278, 280, 282, 298, 300, 302, and 304 may extend parallel to any desired axis (e.g., so long as rubbing directions 276, 282, 298, and 304 are parallel to each other, antiparallel to rubbing directions 278, 280, 300, and 302, and orthogonal to the rubbing directions of lenses 172 and 174 of FIGS. 7 and 8). When arranged in this way, lens 176 may modulate output image light 76 provided to eye box 78 (FIG. 7) while preventing light artifacts from lens 170 from adding with light artifacts from lens 176. This may allow also multiple polarizations of light to pass to eye box 78 of FIG. 7.

In general, lenses 170, 172, 174, and 176 of FIG. 7 may be stacked in any desired order. More than four liquid crystal lenses may be stacked at end 58 of waveguide 48 for modulating output image light 76 without modulating world light 80 if desired. By configuring device 10 in this way (e.g., using the arrangements of FIGS. 1-9), image light from display(s) 18 may be modulated with desired optical characteristics (e.g., optical power) without modulating world light 80, while also minimizing light artifacts associated with the liquid crystal lenses and while eliminating polarization loss associated with light propagating down the length of waveguide 48.

Substrates 202, 206, 208, 212, 224, 228, 230, and 234 of FIG. 8, substrates 262, 266, 268, 272, 284, 288, 290, and 294 of FIG. 9, and substrates 106, 114, 116, 124, 128, 136, 138, and 146 of FIG. 4 may each be referred to as "substrates," "substrate layers," or "transparent layers" herein (e.g., substrate 202, transparent layer 206, substrate layer 294, etc.) but each include a layer of a given transparent material such as glass or transparent plastic that is coated with a polyimide layer/coating (e.g., the layer of transparent material and the corresponding polyimide coating may be referred to herein collectively as a "substrate," "substrate layer," or "transparent layer"). The rubbing directions of substrates 202, 206, 208, 212, 224, 228, 230, and 234 of FIG. 8, substrates 262, 266, 268, 272, 284, 288, 290, and 294 of FIG. 9, and substrates 106, 114, 116, 124, 128, 136, 138, and 146 of FIG. 4 may be defined by the direction of rubbing performed on the corresponding polyimide coating of that substrate. There may also be thin film layers such as patterned transparent electrodes and inorganic or organic insulation layers formed over the substrate and underneath the polyimide layer to provide driving signals (omitted from FIGS. 3-9 for the sake of clarity). The example of FIGS. 3-8 where the liquid crystal molecules within each liquid crystal lens have opposite pretilt angles is merely illustrative. If desired, the pretilt angles within one or more of the liquid crystal lenses may have aligned pretilt angles in the same direction.

Electrode layers 108, 112, 118, 122, 130, 134, 140, and 144 of FIG. 4 and corresponding electrode layers in FIGS. 8 and 9 (not shown in FIGS. 8 and 9 for the sake of clarity) may each include a common (planar) electrode or elongated electrodes (e.g., multiple elongated conductors extending parallel to each other within a given plane and separated by gaps, where each elongated electrode is provided with a desired voltage by control circuitry 12). Any given liquid crystal layer in FIGS. 4, 8, and 9 may have a common electrode formed on one side (e.g., the upper or lower side) and elongated electrodes formed on the other side, may have a common electrode formed on both sides, or may have elongated electrodes formed on both sides. Any of the electrode layers of FIGS. 4, 8, and 9 may include two layers of electrodes separated by an insulator if desired (e.g., two layers of patterned electrodes such as two common electrodes, one common electrode and one layer of elongated electrodes, or two layers of elongated electrodes (e.g., extending parallel or orthogonal to each other) separated by an insulator layer may be formed on one side of the liquid crystal layer).

The foregoing is merely illustrative and various modifications can be made to the described embodiments. The foregoing embodiments may be implemented individually or in any combination.

What is claimed is:

1. An electronic device comprising:
a waveguide having opposing first and second surfaces;
a display configured to emit first light into the waveguide;
a first liquid crystal lens at the first surface and comprising a first liquid crystal layer having first liquid crystal molecules with a first pretilt angle across a thickness of the first liquid crystal layer;
a second liquid crystal lens at the second surface and comprising a second liquid crystal layer having second liquid crystal molecules with a second pretilt angle across a thickness of the second liquid crystal layer, the second pretilt angle being different from the first pretilt angle; and
an output coupler configured to couple the first light out of the waveguide through the first liquid crystal lens.

2. The electronic device defined in claim 1, wherein the first liquid crystal lens comprises a third liquid crystal layer having third liquid crystal molecules with a third pretilt angle that is opposite to the first pretilt angle and wherein the second liquid crystal lens comprises a fourth liquid crystal layer having fourth liquid crystal molecules with a fourth pretilt angle that is opposite to the second pretilt angle.

3. The electronic device defined in claim 2, wherein the second liquid crystal layer is interposed between the fourth liquid crystal layer and the waveguide and wherein the first liquid crystal layer is interposed between the third liquid crystal layer and the waveguide.

4. The electronic device defined in claim 1, wherein the first liquid crystal lens comprises a first transparent substrate layer mounted at the waveguide, a first liquid crystal layer on the first transparent substrate layer, and a second transparent substrate layer on the first liquid crystal layer, wherein the second liquid crystal lens comprises a third transparent substrate layer mounted at the waveguide, a second liquid crystal layer on the third transparent substrate layer, and a fourth transparent substrate layer on the second liquid crystal layer, wherein the first and third transparent substrate layers have a first rubbing direction, and wherein the second and fourth transparent substrate layers have a second rubbing direction antiparallel to the first rubbing direction.

5. The electronic device defined in claim 4, wherein the first liquid crystal lens comprises a fifth transparent substrate layer on the second transparent substrate layer, a third liquid crystal layer on the fifth transparent substrate layer, and a sixth transparent substrate layer on the third liquid crystal layer, wherein the second liquid crystal lens comprises a seventh transparent substrate layer on the fourth transparent substrate layer, a fourth liquid crystal layer on the seventh transparent substrate layer, and an eighth transparent substrate layer on the fourth liquid crystal layer, wherein the seventh and fifth transparent substrate layers have the second rubbing direction, and wherein the eighth and sixth transparent substrate layers have the first rubbing direction.

6. The electronic device defined in claim 4, wherein the first liquid crystal lens comprises a first electrode layer on the first transparent substrate layer and a second electrode layer on the second transparent substrate layer, wherein the second liquid crystal lens comprises a third electrode layer on the third transparent substrate layer and a fourth electrode layer on the fourth transparent substrate layer, wherein first voltages are provided between the first and second electrode layers that configure the first liquid crystal layer to exhibit a first index of refraction profile, and wherein the second voltages are provided between the third and fourth electrode layers that configure the second liquid crystal layer to exhibit a second index of refraction profile that is an inverse of the first index of refraction profile.

7. The electronic device defined in claim 1, further comprising:
    a linear polarizer interposed between the first liquid crystal lens and the first surface of the waveguide.

8. The electronic device defined in claim 7, wherein the linear polarizer has a transmission axis, wherein the first liquid crystal lens comprises a first plurality of stacked transparent substrates having first rubbing directions, wherein the second liquid crystal lens comprises a second plurality of stacked transparent substrates having second rubbing directions, and wherein the first and second rubbing directions are aligned with the transmission axis.

9. The electronic device defined in claim 1, further comprising:
    a third liquid crystal lens mounted to the first liquid crystal lens and aligned with the first and second liquid crystal lenses; and
    a fourth liquid crystal lens mounted to the second liquid crystal lens and aligned with the first, second, and third liquid crystal lenses, wherein the first and second liquid crystal lenses have first rubbing directions, and the third and fourth liquid crystal lenses have second rubbing directions orthogonal to the first rubbing directions.

10. The electronic device defined in claim 1, wherein the output coupler comprises a diffractive grating embedded within the waveguide and wherein the second pretilt angle is opposite the first pretilt angle.

11. An optical system configured to convey first light from a display and second light, the optical system comprising:
    a waveguide having opposing first and second surfaces;
    a first transparent layer at the first surface;
    a first liquid crystal layer mounted to the first transparent layer;
    a second transparent layer mounted to the first liquid crystal layer, wherein the first and second transparent layers and the first liquid crystal layer are configured to pass the first light and the second light;
    a third transparent layer at the second surface;
    a second liquid crystal layer mounted to the third transparent layer; and
    a fourth transparent layer mounted to the second liquid crystal layer, wherein the third and fourth transparent layers and the second liquid crystal layer are configured to pass the second light, wherein the first and third transparent layers have a first rubbing direction, and wherein the second and fourth transparent layers have a second rubbing direction different from the first rubbing direction.

12. The optical system defined in claim 11, further comprising:
    a fifth transparent layer mounted to the second transparent layer;
    a third liquid crystal layer mounted to the fifth transparent layer; and
    a sixth transparent layer mounted to the third liquid crystal layer, wherein the fifth transparent layer has the second rubbing direction and the sixth transparent layer has the first rubbing direction, and wherein the fifth and sixth transparent layers and the third liquid crystal layer are configured to pass the first light and the second light.

13. The optical system defined in claim 12, further comprising:
    a seventh transparent layer mounted to the fourth transparent layer;
    a fourth liquid crystal layer mounted to the seventh transparent layer; and
    an eighth transparent layer mounted to the fourth liquid crystal layer, wherein the seventh transparent layer has the second rubbing direction and the eight transparent layer has the first rubbing direction, and wherein the seventh and eighth transparent layers and the fourth liquid crystal layer are configured to pass the second light.

14. The optical system defined in claim 13, further comprising:
    first elongated electrodes and a first common electrode coupled to opposing sides of the first liquid crystal layer;
    second elongated electrodes and a second common electrode coupled to opposing sides of the second liquid crystal layer, wherein the first elongated electrodes extend parallel to the second elongated electrodes;
    third elongated electrodes and a third common electrode coupled to opposing sides of the third liquid crystal layer; and
    fourth elongated electrodes and a fourth common electrode coupled to opposing sides of the fourth liquid crystal layer, wherein the third elongated electrodes extend parallel to the fourth elongated electrodes and orthogonal to the first and second elongated electrodes.

15. The optical system defined in claim 13, further comprising:
    a linear polarizer interposed between the third transparent layer and the waveguide, wherein the linear polarizer has a transmission axis aligned with the first and second rubbing directions.

16. A display comprising:
    pixels;
    a waveguide configured to convey first light emitted by the pixels;
    a first liquid crystal lens at a first side of the waveguide;
    a second liquid crystal lens on the first liquid crystal lens;

a third liquid crystal lens at a second side of the waveguide; and a fourth liquid crystal lens on the third liquid crystal lens, wherein the third and fourth liquid crystal lenses are configured to pass the first light and second light from the first and second liquid crystal lenses, the first liquid crystal lens has first antiparallel rubbing directions, the second liquid crystal lens has second antiparallel rubbing directions different from the first antiparallel rubbing directions, the third liquid crystal lens has third antiparallel rubbing directions aligned with the first antiparallel rubbing directions, and the fourth liquid crystal lens has fourth antiparallel rubbing directions aligned with the second antiparallel rubbing directions.

17. The display defined in claim 16, wherein each of the first, second, third, and fourth liquid crystal lenses comprises:

a first layer of liquid crystal molecules having a first pretilt angle; and a second layer of liquid crystal molecules having a second pretilt angle different from the first pretilt angle.

18. A display comprising:

a waveguide having opposing first and second sides, the waveguide being configured to propagate light via total internal reflection and comprising an output coupler;

a first liquid crystal layer at the first side; and a second liquid crystal layer at the second side, wherein the first liquid crystal layer comprises first liquid crystal molecules having a first pretilt angle across a thickness of the first liquid crystal layer and the second liquid crystal layer comprises second liquid crystal molecules having a second pretilt angle, and wherein the output coupler is configured to couple the light propagated via total internal reflection out of the waveguide through the first liquid crystal layer.

19. The display of claim 18, wherein the second liquid crystal molecules have the second pretilt angle across a thickness of the second liquid crystal layer and the second pretilt angle is opposite the first pretilt angle.

20. The display of claim 18, wherein the first liquid crystal layer has a lateral area and the thickness is uniform across the lateral area.

* * * * *